No Model.
J. E. MORRIS, D. H. DORSETT & B. WILLIAMS.
UNDERGROUND CONDUIT FOR ELECTRICAL CONDUCTORS.
No. 303,035. Patented Aug. 5, 1884.
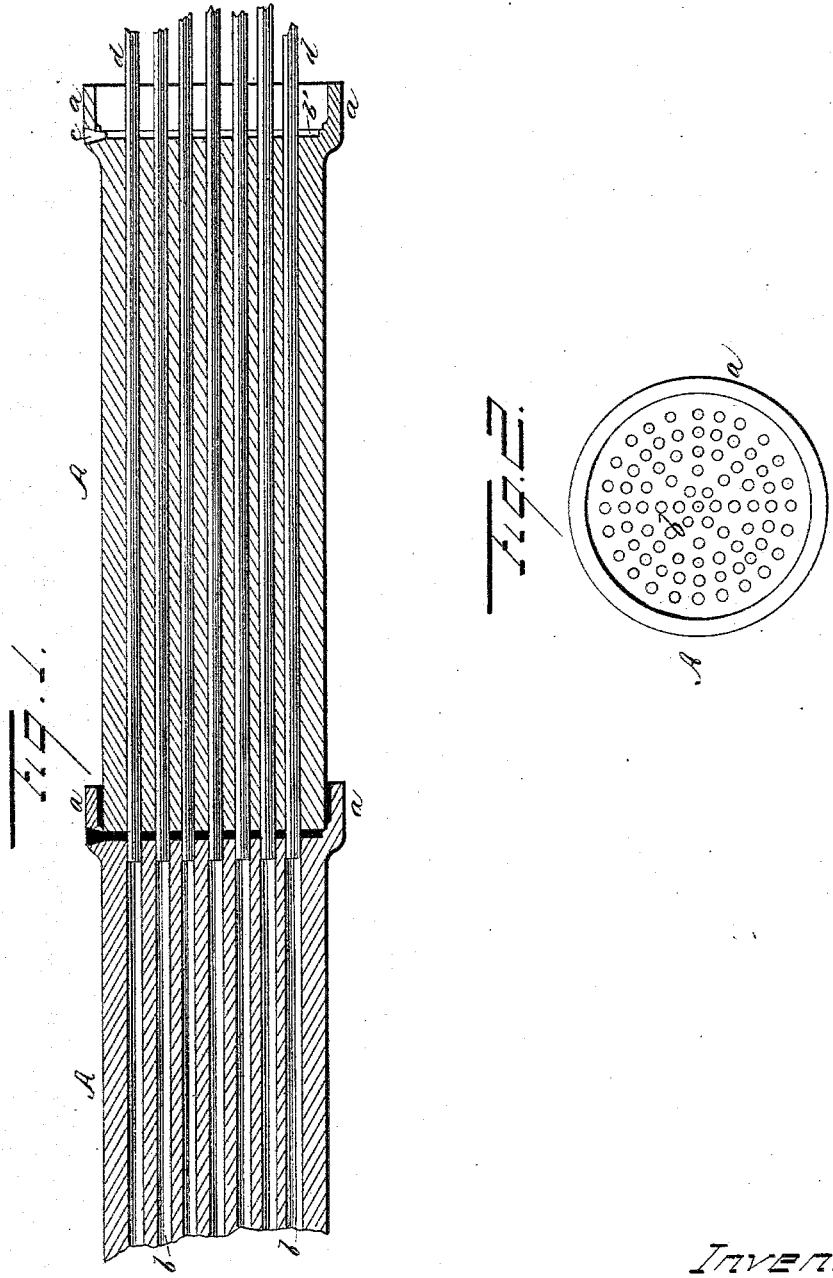

United States Patent Office.

JOSEPH E. MORRIS, DANIEL H. DORSETT, AND BENEZETTE WILLIAMS, OF CHICAGO, ILLINOIS; SAID MORRIS ASSIGNOR TO SAID WILLIAMS.

UNDERGROUND CONDUIT FOR ELECTRICAL CONDUCTORS.

SPECIFICATION forming part of Letters Patent No. 303,035, dated August 5, 1884.

Application filed March 12, 1883. (No model.)

*To all whom it may concern:*

Be it known that we, JOSEPH E. MORRIS, DANIEL H. DORSETT, and BENEZETTE WILLIAMS, all citizens of the United States, residing at Chicago, in the county of Cook and State of Illinois, have invented certain new and useful Improvements in Underground Conduits for Electrical Conductors, of which the following is a specification, to wit:

Our invention relates to conduits for underground telegraph and other electric wires; and it consists in the construction of a continuous cellular conduit of non-conducting material—such as asphaltum concrete—substantially as will be more fully explained.

In order to enable others skilled in the art to avail themselves of our invention, we will now proceed to describe its construction, referring to the accompanying drawings, in which—

Figure 1 is a longitudinal section of the conduit, and Fig. 2 an end view of one of the sections.

A represents a cylindrical conduit, formed in sections of suitable diameter and length for convenience of handling, each of which is formed with an enlarged projecting flange, $a$, upon one end of an internal diameter sufficient to receive the smaller end of the next section. Each section A is also formed with longitudinal holes or passages $b\ b$, extending their entire length, and of such shape, size, and number as may be found most desirable.

The sections of the conduit may be made of any non-conducting material, but are preferably constructed of asphaltum concrete, and are placed in the ground, where the small end of one is inserted in the large or flanged end of the other in such position that the passages $b\ b$ in each will register. The flange $a$ is so made as to prevent the end of the adjoining section from abutting against the solid portion of the first, but leave a small space, $b'$, between them, which is connected with the outside of the conduit by an orifice, $c$, extending through the flange, as seen in the drawings. When these sections are placed together in forming a conduit, the passages are each filled with a rod, $d$, of any suitable material, which extends through one section into the other through the space $b'$, as shown in Fig. 1, and this space is then filled with heated liquid asphaltum or other non-conducting material, which completely fills the space and firmly cements the sections together, forming a continuous conduit having continuous passages or cells $b$ extending through it.

It is obvious that this conduit may be cheaply and quickly made, and placed in position of any shape and with any number and sized passages that may be desired, and through these passages are passed the electric wires or cables, and each is effectually insulated from the others and from outside influence.

The liquid non-conductor—preferably of the same material as the sections—is poured in while in an intensely-heated state, and its contact with the sections softens their adjacent faces, and the filling thereby unites with them, and the whole is formed into a homogeneous and continuous conduit, as described.

Having thus fully described our invention, what we claim as new, and desire to secure by Letters Patent, is—

1. A conduit for electric conductors, formed in sections having a series of registering passages, with the joint between the sections formed by a non-conducting material, which connects the sections together, and at the same time forms between the sections the walls of the continuous passages of the conduit, into and from which the wires may be inserted and withdrawn at will, substantially as described.

2. A conduit for electric conductors, formed in sections having a series of registering passages, one of said sections being formed with a flange constructed to receive the end of the adjoining sections, and to prevent said section from abutting against its end, so as to form an inclosed space between the adjacent ends of the two sections, and a non-conducting material in said space for cementing the sections together and surrounding the continuation of the passages between the sections, substantially as described.

In testimony whereof we affix our signatures in presence of two witnesses.

JOSEPH E. MORRIS.
    DANIEL H. DORSETT.
    BENEZETTE WILLIAMS.

Witnesses:
 J. E. STEVENSON,
 ELIAS BRAMAN.